(12) United States Patent
Kaser

(10) Patent No.: US 10,207,651 B2
(45) Date of Patent: Feb. 19, 2019

(54) STABLE MOUNTING SYSTEM FOR SEATBACK SHELVING

(71) Applicant: Advanced Simplicity LLC, Coppell, TX (US)

(72) Inventor: Matthew C. Kaser, Coppell, TX (US)

(73) Assignee: Advanced Simplicity LLC, Coppell, TX (US)

( * ) Notice: Subject to any disclaimer, the term of this patent is extended or adjusted under 35 U.S.C. 154(b) by 214 days.

(21) Appl. No.: 15/188,256

(22) Filed: Jun. 21, 2016

(65) Prior Publication Data

US 2016/0297375 A1 Oct. 13, 2016

Related U.S. Application Data

(63) Continuation of application No. 13/789,771, filed on Mar. 8, 2013, now Pat. No. 9,399,432.

(51) Int. Cl.
| | |
|---|---|
| *B60R 11/02* | (2006.01) |
| *B60N 2/879* | (2018.01) |
| *B60R 7/04* | (2006.01) |
| *B60R 11/00* | (2006.01) |
| *B60N 2/90* | (2018.01) |

(52) U.S. Cl.
CPC ............ *B60R 11/02* (2013.01); *B60N 2/879* (2018.02); *B60R 7/043* (2013.01); *B60R 11/00* (2013.01); *B60N 2002/905* (2018.02); *B60R 2011/0017* (2013.01); *B60R 2011/0276* (2013.01)

(58) Field of Classification Search
CPC ............ B60R 7/043; B60R 2011/0276; B60R 2011/0017; B60R 11/02; B60N 2002/905
See application file for complete search history.

(56) References Cited

U.S. PATENT DOCUMENTS

| | | |
|---|---|---|
| 4,792,183 A | 12/1988 | Townsend |
| 4,971,393 A | 11/1990 | Maisenhalder |
| 5,791,614 A | 8/1998 | Sims |
| 5,984,347 A | 11/1999 | Blanc-rosset |
| 6,231,017 B1 | 5/2001 | Watkins |
| 6,607,241 B2 | 8/2003 | Johnston |
| 7,090,302 B1 | 8/2006 | Seastrom |
| 7,111,814 B1 | 9/2006 | Newman |
| 7,201,443 B2 | 4/2007 | Cilluffo et al. |
| 7,281,762 B1 | 10/2007 | Getfield |
| 7,395,997 B2 | 7/2008 | Padden |
| 7,784,864 B2 | 8/2010 | Feder |
| 7,862,112 B2 | 1/2011 | Caturia et al. |
| 8,678,680 B1 | 3/2014 | Pelini |
| 2003/0121943 A1 | 7/2003 | Chou |
| 2006/0032996 A1 | 2/2006 | Wu |

(Continued)

FOREIGN PATENT DOCUMENTS

EP 2514638 A1 * 10/2012 ............ B60R 7/043

*Primary Examiner* — David R Dunn
*Assistant Examiner* — Tania Abraham
(74) *Attorney, Agent, or Firm* — William D. Cramer

(57) ABSTRACT

This invention relates to a mechanism for attaching shelving, hooks, and organizers to a vehicle seatback. The attachment mechanism fits over the vehicle seat headrest posts, providing stability to the shelving, hooks, or organizers. The mechanism is formed as a single piece, thus it can be installed and removed without any additional components such as screws, bolts, straps, or other parts.

18 Claims, 6 Drawing Sheets

(56) References Cited

U.S. PATENT DOCUMENTS

| | | | |
|---|---|---|---|
| 2006/0169730 A1* | 8/2006 | Morrison | B60R 11/02 224/275 |
| 2011/0155024 A1* | 6/2011 | McCaffrey | B60N 3/004 108/26 |
| 2014/0244410 A1 | 8/2014 | Altman | |
| 2014/0326762 A1* | 11/2014 | Nolan | B60R 7/043 224/275 |

* cited by examiner

STABLE MOUNTING SYSTEM FOR SEATBACK SHELVING

RELATED APPLICATIONS

This application is a continuation of U.S. application Ser. No. 13/789,771, filed Mar. 8, 2013, which issued on Jul. 26, 2016 as U.S. Pat. No. 9,399,432, and which is incorporated by reference for all purposes.

BACKGROUND OF THE INVENTION

There are a number of shelving and organizer systems available which mount to the back of the front seat of a motor vehicle. By way of example, these systems may allow a passenger in the back seat to watch a movie on a portable video player placed on a shelf mounted to the seatback, place food or beverages on a shelf mounted to the seatback, use such a shelf as a desktop or workplace, or attach storage or trash containers to the seatback.

There are a number of mechanisms for temporarily attaching these systems to the seatback without modifying the vehicle, including straps that wrap around the headrest, plastic or cloth cords that wrap around the headrest posts, and hooks that go over the seat itself. However, these mechanisms can loosen, they can interfere with the comfort of the front seat passenger, and since they are not fixed in place, they can move unexpectedly as the vehicle starts, stops, or turns sharply. One recent patent application (U.S. patent application Ser. No. 12/661,931) discloses a mechanism where two attachment members slip over the two headrest posts. Because each of the attachment members have at least two points of contact with the headrest post, the mechanism is less likely to move unexpectedly as the vehicle starts, stops, or turns sharply. However, this mechanism requires a number of additional parts—washers, nuts, bolts, and the like—in order to fix the position of the two attachment members. Not only do these additional parts lead to additional labor when installing and removing the system, they also can easily be dropped between seats or misplaced while not in use.

What is needed, therefore, is a mechanism for attaching shelving, hooks, and organizers to a seatback that provides stability, can be easily installed and removed, and yet uses a minimum of parts.

SUMMARY OF THE INVENTION

The present invention discloses a mechanism for attaching shelving, hooks, and organizer units to a seatback that provides stability, can be easily installed and removed, and uses a minimum number of parts. In one embodiment of the invention, the mechanism is formed as part of a single piece of material with varying thickness (height) characteristics. One end (the "attachment portion") interfaces with the headrest post on the front seatback, the other end (the "utility portion") provides shelving, organizer units, or other passenger amenities. In this embodiment, the attachment portion has a generally-round hole, the hole being slightly larger than the size of a seat headrest post. Adjacent to the hole, the attachment portion has a slot, substantially wider than the size of a headrest post in one dimension and slightly larger than the size of a headrest post in the other dimension. The slot is located at a distance from the first hole such that with the headrest removed, the attachment portion can accommodate the two headrest posts, with one post passing through the hole and the other post passing through the slot. Because one of the holes is about the size of the headrest post while the slot is substantially wider than the hole, the mechanism fits the headrest posts irrespective of the distance between the headrest posts. Further, because the first hole is only slightly larger than the headrest post, left-to-right and front-to-back movement is restricted. Further, because the attachment portion has thickness (height), movement around an axis between the headrest posts is limited. And finally, once the headrest is replaced, up and down movement is further restricted. The utility portion can be formed to accommodate various passenger access positions and, for example, a shelf for a portable DVD player. Thus, this embodiment provides a simple, stable, easily-installed, headrest-mounted shelf without the need for any components other than the shelf itself. Other variations are set forth in the Detailed Description of the Invention.

DETAILED DESCRIPTION OF THE INVENTION

Figure 1:
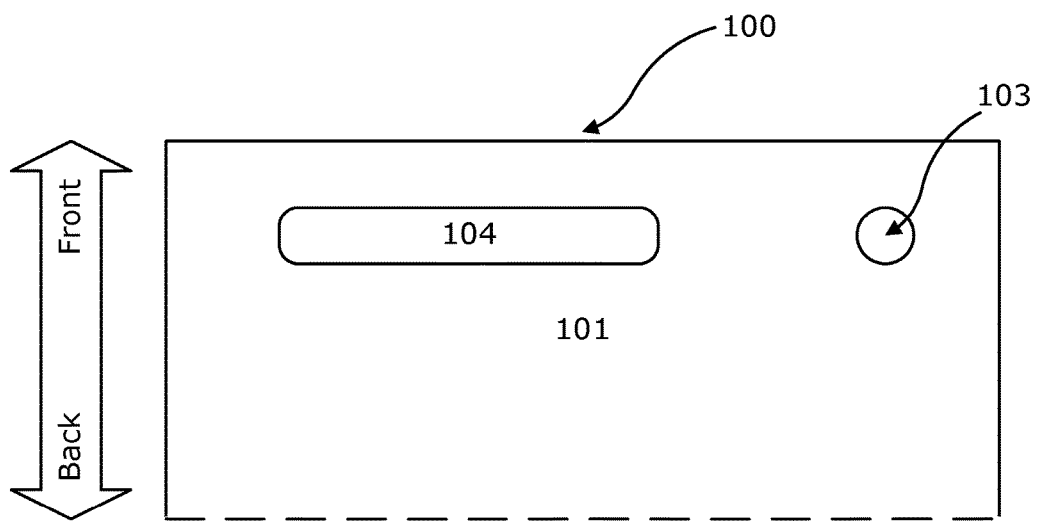
FIG. 1 shows a top view of a portion of an embodiment of the present invention.

FIG. 1 shows a top view of Unit 100 in an embodiment of the present invention. The Attachment Portion 101 of Unit 100 is positioned with respect to the vehicle as indicated by the "front" arrow, and the Utility Portion 102 of Unit 100 is positioned with respect to the vehicle as indicated by the "back" arrow (Utility Portion 102 is not shown in FIG. 1). Hole 103 is substantially round, about 0.70 in diameter, about 1.00 inch from the front of Attachment Portion 101, and about 1.25 inch from the right side of Attachment Portion 101. Hole 103 passes entirely through Attachment Portion 101. Slot 104 is about 0.70 inch from front to back, about 5.00 inches wide, about too inch from the front of Attachment Portion 101, and about 1.25 inches from the left side of Attachment Portion 101. Slot 104 passes entirely through Attachment Portion 101. Obviously, Hole 103 could be positioned on the left side of Attachment Portion 101 and Slot 104 could be positioned on the right side of Attachment Portion 101 without affecting the invention. Further, Hole 103 and Slot 104 could be larger or smaller to accommodate different sized and spaced headrest posts, with the width of Attachment Portion 101 varying to accommodate Hole 103 and Slot 104.

Figure 2:
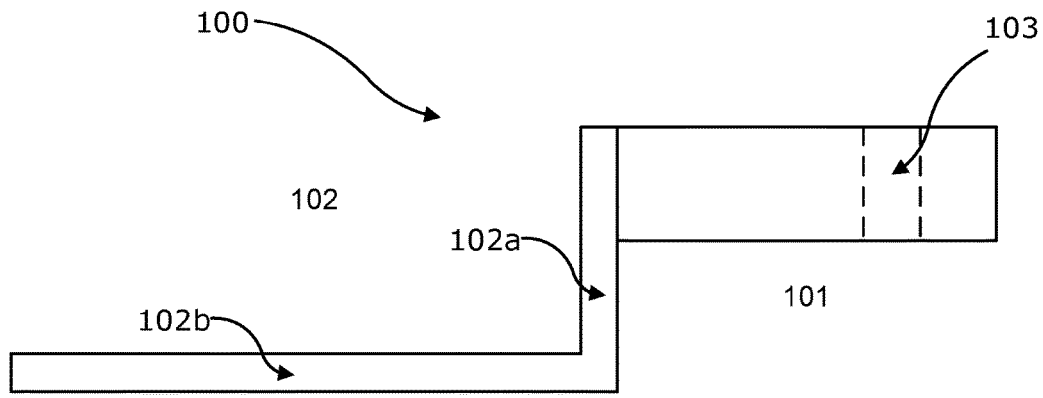
FIG. 2 shows a side view of a portion of an embodiment of the present invention.

FIG. 2 shows a side view of Unit 100 in an embodiment of the present invention. Attachment Portion 101 is about 2.00 inches thick where Hole 103 and Slot 104 pass through Attachment Portion 101 (Hole 103 is shown in outline in FIG. 2). Utility Portion 102 is about 0.25 inch thick. In the embodiment shown in FIG. 2, Utility Portion 102 is bent in an "L" shaped, comprising Shelf Support 102a and Shelf 102b, Shelf Support 102a and Shelf 102b being perpendicular with each other, and Shelf Support 102a being joined with the back of Attachment Portion 101; however, in other embodiments (not shown), Shelf Support 102a could be attached at any angle with respect to the back of Attachment Portion 101. In the embodiment shown in FIG. 2, the Utility Portion 102 is parallel to Attachment Portion 101; however, in other embodiments, Utility Portion 102 could be at a different angle to accommodate different functionalities. By way of example and not limitation, if Utility Portion 102 is to be used as a video player shelf, Utility Portion 102 could be angled to accommodate a comfortable viewing angle for the back seat passenger.

Figure 3:
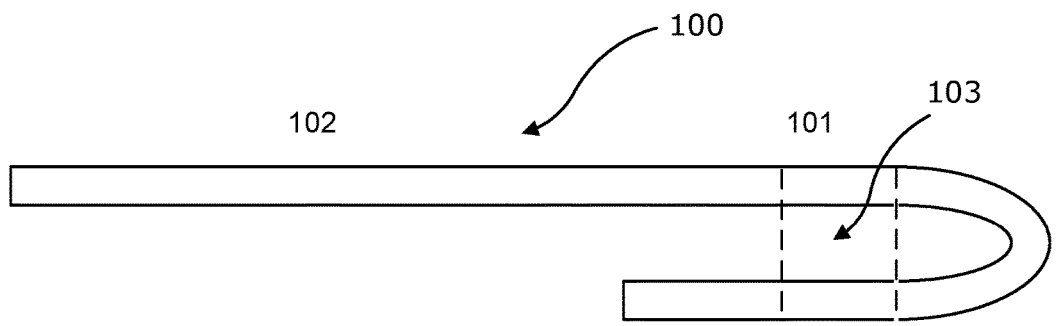
FIG. 3 shows a side view of a portion of another embodiment of the present invention.

In another embodiment of the present invention, shown in FIG. 3, Unit 100 is made of a single piece of rigid plastic material. In this embodiment, the required thickness of Attachment Portion 101 is achieved by bending the plastic in a U-shape. Attachment Portion 101 is made of 0.25 inch thick plastic, but because of the U-shape, it is effectively about 1.00 inch thick where Hole 103 and Slot 104 pass through Attachment Portion 101 (Hole 103 is shown in outline in FIG. 3). This embodiment has the advantage of using a single piece of material rather than two pieces of material that need to be attached. However, depending on the materials and tooling costs, the manufacturing costs associated with forming the U-shaped bend may outweigh the costs of joining a separate Attachment Portion 101 and Utility Portion 102.

Figure 4:
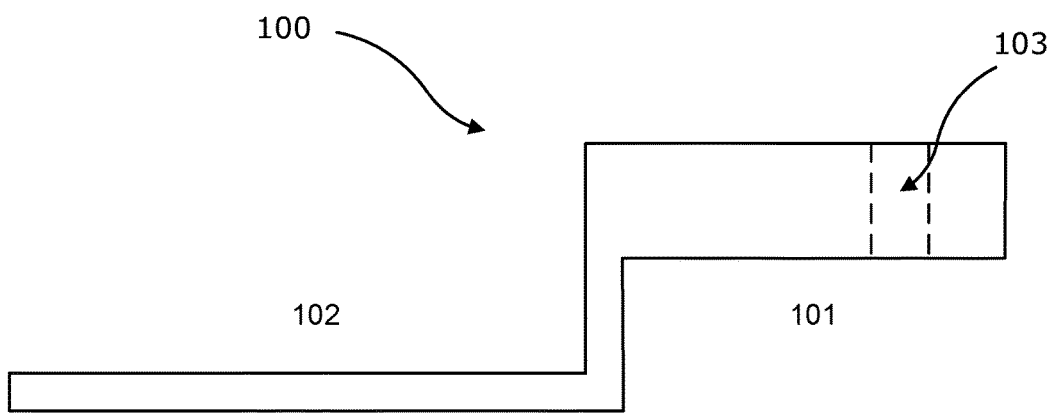
FIG. 4 shows a side view of a portion of another embodiment of the present invention.

In another embodiment of the present invention, shown in FIG. 4, Unit 100 is made of a single piece of molded rigid material. In this embodiment, the required thickness of Attachment Portion 101 is achieved by having a thicker portion of the mold, and the shape of Utility Portion 102 is achieved by using a mold shaped for the desired functionality.

In each of the foregoing embodiments, Unit 100 is made from any rigid material that can be manipulated in a manner suitable for the given embodiment. By way of example and not limitation, it could be made from acrylonitrile butadiene styrene, polycarbonate, acrylic, and the like. In those embodiments in which Unit 100 is made of multiple components, the components could be joined using methods known in the art, such as using a solvent or using welding methods. In addition to using rigid plastic materials, Unit 100 could be made of a composite material, such as fiberglass, that could be molded into the desired shape.

Figure 5A:
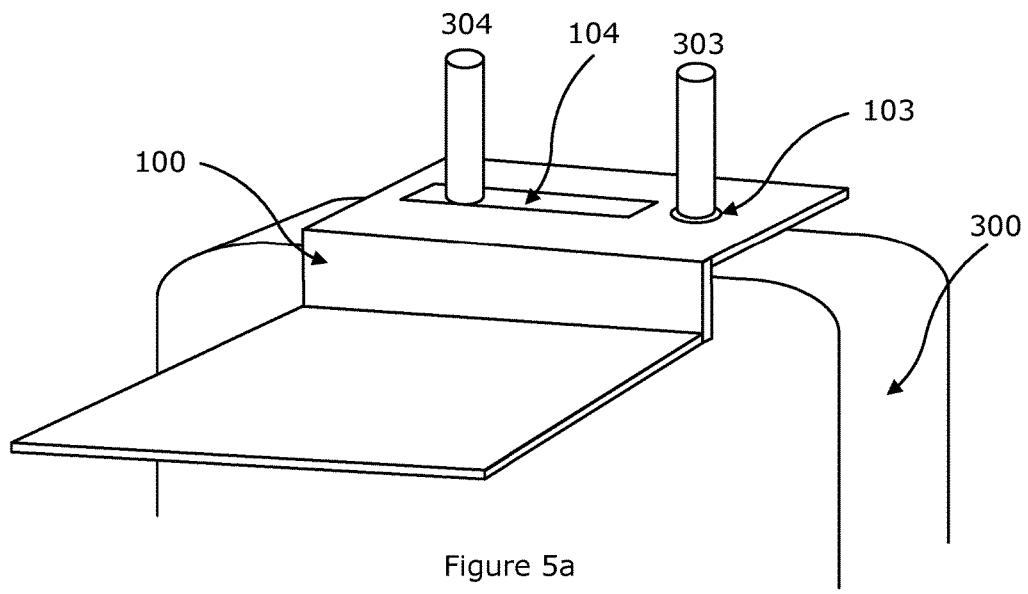
FIG. 5a shows an angled view of a portion of an embodiment of the present invention after it has been installed onto the seat but before the headrest has been reinstalled.

FIG. 5a shows an angled view of installation of Unit 100 over headrest Posts 303 and 304 (Headrest 301, not shown, has been removed from Seat 300). Unit 100 is aligned with the seat such that Hole 103 and Slot 104 align with Posts 303 and 304, respectively, and Unit 100 is lowered with Posts 303 and 304 going through Hole 103 and Slot 104 until Unit 100 comes to rest against the top of Seat 300.

Figure 5B:
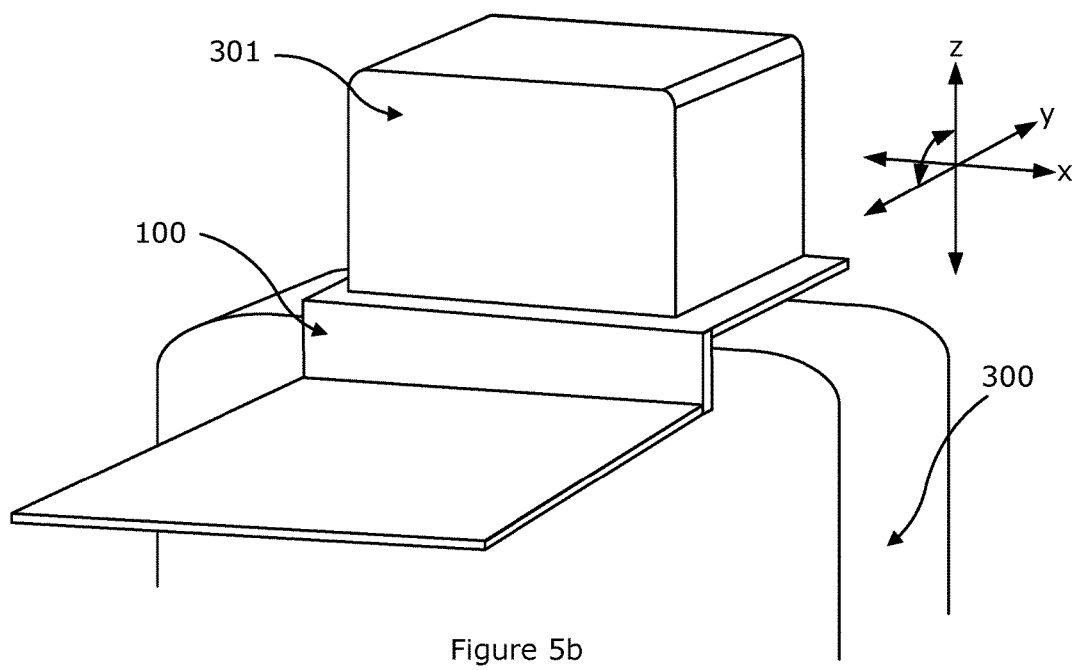
FIG. 5b shows the same embodiment after the headrest has been reinstalled.

FIG. 5b shows an angled view of Unit 100 after Headrest 301 has been place back over Posts 303 and 304. Because Headrest 301 is pushed down over Unit 100 will not move significantly in the Z direction (although if Headrest 301 is raised, Unit 100 may move somewhat in the Z direction, but its movement will be limited by Headrest 300). Because of the thickness of Unit 100 where Posts 303 and 304 pass through Hole 103 and Slot 104, Unit 100 will not rotate significantly around the X axis (running parallel to Unit 100 between Hole 103 and Slot 104). Because Hole 103 is roughly the same diameter as Post 303, Unit 100 will not move significantly in the X direction. Because Hole 103 and Slot 104 are roughly the same width as Posts 303 and 304, Unit 100 will not move significantly in the Y direction.

Figure 6:
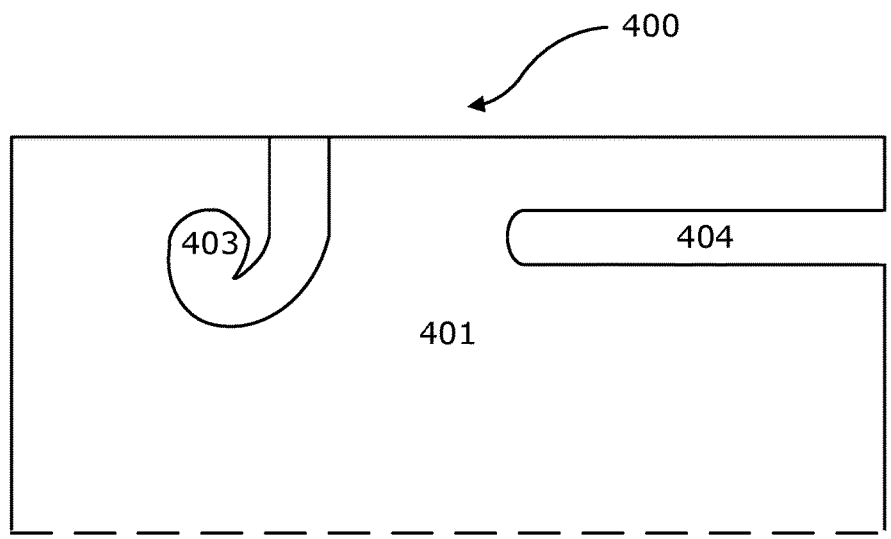
FIG. 6 shows a top view of a portion of an embodiment of the present invention.

In each of the foregoing embodiments, installation of the unit requires that the consumer remove the headrest. However, in some vehicles, the consumer can raise or lower, but not remove, the headrest. FIG. 6 shows an embodiment of the present invention suitable for such vehicles. In this embodiment, Attachment Portion 401 has a straight Slot 404 that opens on the right side of Attachment Portion 401 and a curved Slot 403 that opens on the front side of Attachment Portion 401. In this embodiment, the consumer installs Unit 400 by sliding Slot 404 through the right headrest post at an angle until Slot 403 reaches the left headrest post; the consumer slides the left headrest post through Slot 403 until the post reaches the innermost portion of Slot 403. Slot 403 is spiral-shaped to limit the amount of movement along the x- and y-axes.

FIGS. 7-10 show a number of variations on Utility Portion 102; these variations are shown using the first embodiment of Attachment Portion 101, however, it should be clear that any of the embodiments of Attachment Portion 101 can be used.

Figure 7:
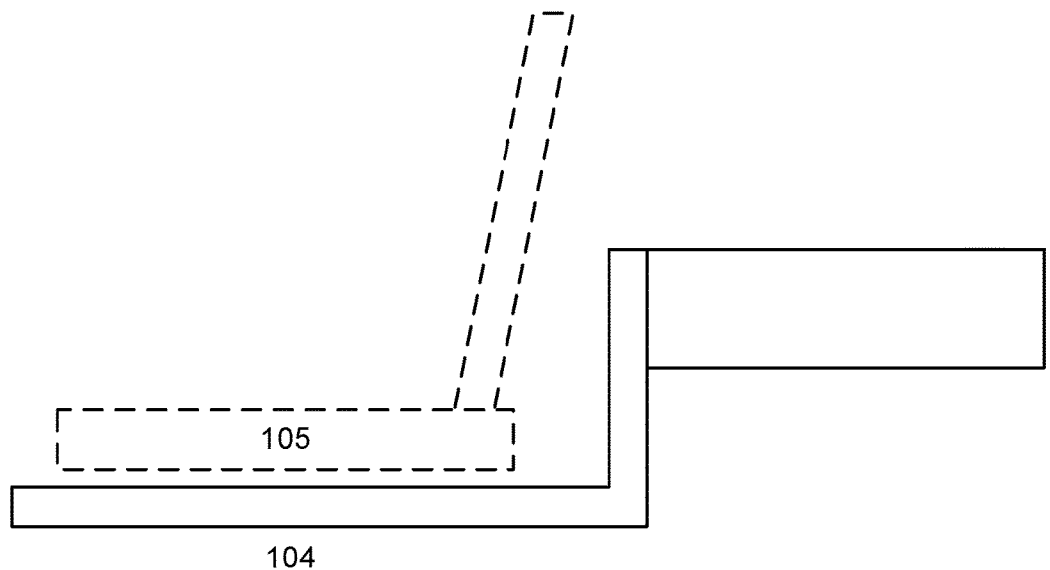
FIG. 7 shows a side view of an embodiment of the present invention, suitable for use with a portable DVD player.

In FIG. 7, Utility Portion 102 comprises a Shelf 104, upon which the consumer could place an Entertainment System 105 such as a portable DVD player or video game display onto Shelf 104, which could be angled so that Entertainment System 105 or would be at a comfortable viewing position for the back seat passenger (as suggested by the outline form of Entertainment System 105).

Figure 8:
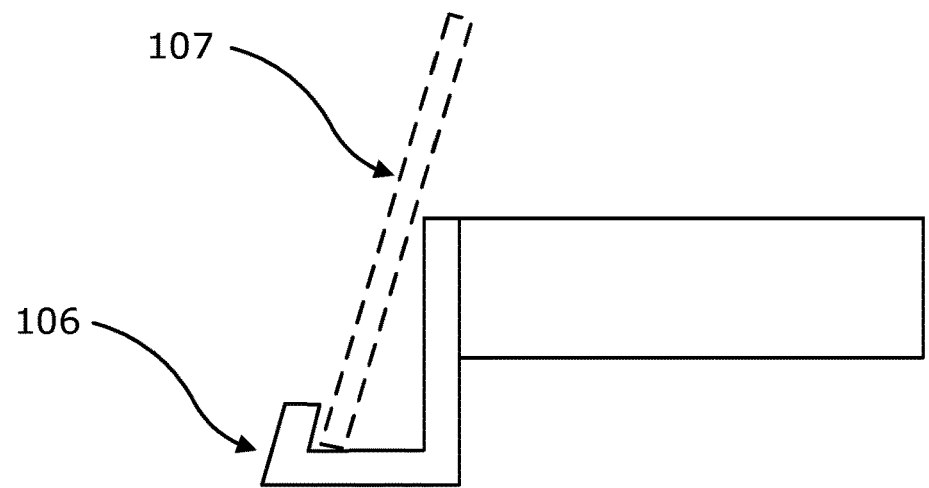
FIG. 8 shows a side view of an embodiment of the present invention, suitable for use with a tablet computer.

In FIG. 8, Utility Portion 102 comprises a Slot 106 where the consumer could place Tablet Computer 107 into Slot 106. Slot 106 would be angled so that Tablet Computer 107 would be at a comfortable viewing position for the consumer (as suggested by the outline form of Tablet Computer 107).

Figure 9:
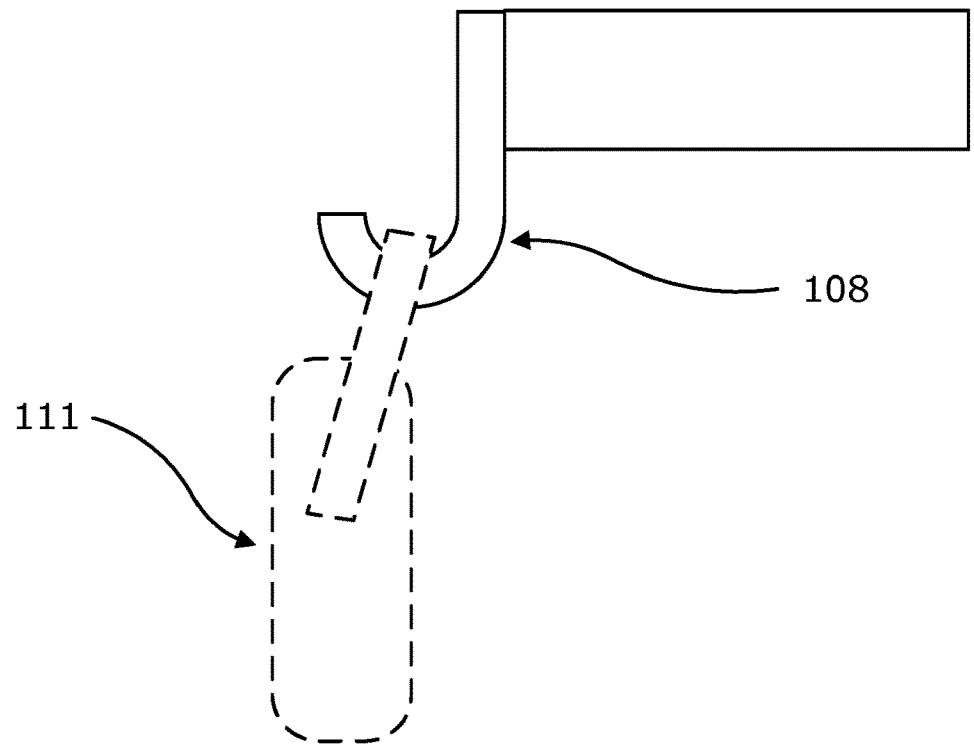
FIG. 9 shows a side view of an embodiment of the present invention, suitable for use with a backseat organizer.

In FIG. 9, Utility Portion 102 comprises a Hook 108, from which the consumer could hang a backseat Organizer 109, Backpack no or Handbag 111 (as suggested by the outline form of Handbag in).

Figure 10:
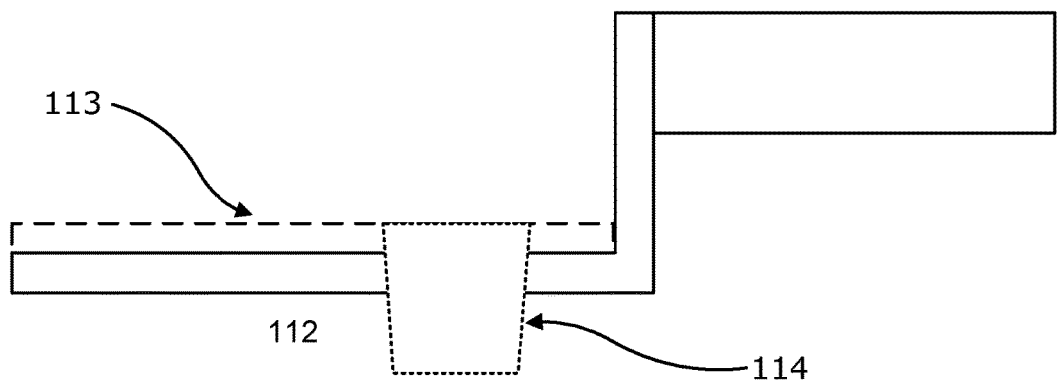
FIG. 10 shows a side view of an embodiment of the present invention, suitable for use as a food and beverage shelf.

In FIG. 10, Utility Portion 102 comprises Shelf 112 which comprises Lip 113 and Cup Holder 114 so that the consumer could place food and a beverage on Shelf 112.

While specific embodiments have been illustrated and described, numerous modifications come to mind without significantly departing from the spirit of the invention, and the scope of protection is only limited by the scope of the accompanying Claims.

The invention claimed is:

1. A vehicle headrest-mountable portable DVD player shelf system comprising:
   a substantially-flat attachment portion having a top surface and a bottom surface, and comprising a hole and a slot, the hole and slot passing from the top surface to the bottom surface, where
   the hole and slot are spaced at a suitable distance with respect to each other to receive two headrest posts from a first vehicle seat extending through the hole and slot,
   the hole is slightly larger than the diameter of the first headrest post, the slot is, in one dimension, slightly larger than the diameter of the second headrest post, and in a second dimension, wide enough to accommodate varying distances between the first headrest post and the second headrest post, such that when the headrest posts are inserted into the hole and slot, the attachment portion does not require additional parts to prevent substantial movement of the attachment portion in any direction parallel with the attachment portion, and the attachment portion is sufficiently thick such that, when the system is installed over the headrest posts, the system does not require additional parts to prevent substantial rotation of the attachment portion along an axis between the hole and the slot; and a utility portion comprising a shelf and a shelf support, where the shelf is generally parallel with the attachment portion and of sufficient size and shape to accommodate a portable DVD player and the shelf support is positioned between and generally perpendicular to the attachment portion and the shelf;

where the utility portion and attachment portion comprise a single piece of rigid material; and where when the system is installed over the headrest posts, the utility portion extends away from the attachment portion and towards a second vehicle seat directly behind the first vehicle seat.

2. The shelf system of claim 1, where the attachment portion is thicker than the utility portion.

3. The shelf system of claim 1, where attachment portion, shelf, and shelf support have been joined together using a solvent to form the single piece of rigid material.

4. The shelf system of claim 1, where attachment portion, shelf, and shelf support have been welded together to form the single piece of rigid material.

5. The shelf system of claim 1, where attachment portion, shelf, and shelf support have been formed from a solid piece of rigid material bent to form the generally perpendicular angles between the shelf and shelf support and between the attachment portion and shelf support.

6. The shelf system of claim 1, where attachment portion, shelf, and shelf support have been molded to form the single piece of rigid material.

7. A vehicle headrest-mountable tablet computer shelf system comprising:

a substantially-flat attachment portion having a top surface and a bottom surface, and comprising a hole and a slot, the hole and slot passing from the top surface to the bottom surface, where the hole and slot are spaced at a suitable distance with respect to each other to receive two headrest posts from a first vehicle seat extending through the hole and slot, the hole is slightly larger than the diameter of the first headrest post, the slot is, in one dimension, slightly larger than the diameter of the second headrest post, and in a second dimension, wide enough to accommodate varying distances between the first headrest post and the second headrest post, such that when the headrest posts are inserted into the hole and slot, the attachment portion does not require additional parts to prevent substantial movement of the attachment portion in any direction parallel with the attachment portion, and the attachment portion is sufficiently thick such that, when the system is installed over the headrest posts, the system does not require additional parts to prevent substantial rotation of the attachment portion along an axis between the hole and the slot; and a utility portion comprising a shelf and a shelf support, where the shelf support is positioned between the attachment portion and the shelf, the shelf support is substantially perpendicular to the attachment portion, the shelf has sufficient width to accommodate a tablet computer, and the shelf comprises an upward-angled lip on the distal portion, with respect to the shelf support, to limit motion of the tablet computer;

where the utility portion and attachment portion comprise a single piece of rigid material; and where when the system is installed over the headrest posts, the utility portion extends away from the attachment portion and towards a second vehicle seat directly behind the first vehicle seat.

8. The shelf system of claim 7, where the attachment portion is thicker than the utility portion.

9. The shelf system of claim 7, where attachment portion, shelf, and shelf support have been joined together using a solvent to form the single piece of rigid material.

10. The shelf system of claim 7, where attachment portion, shelf, and shelf support have been welded together to form the single piece of rigid material.

11. The shelf system of claim 7, where attachment portion, shelf, and shelf support have been formed from a solid piece of rigid material bent to form the generally perpendicular angle between the attachment portion and shelf support.

12. The shelf system of claim 7, where attachment portion, shelf, and shelf support have been molded to form the single piece of rigid material.

13. A vehicle headrest-mountable tablet computer shelf system comprising:

a substantially-flat attachment portion having a top and bottom surface, and comprising a hole and a slot, the hole and slot passing from the top surface to the bottom surface, where the hole and slot are spaced at a suitable distance with respect to each other to receive two headrest posts from a first vehicle seat extending through the hole and slot, the hole is slightly larger than the diameter of the first headrest post, the slot is, in one dimension, slightly larger than the diameter of the second headrest post, and in a second dimension, wide enough to accommodate varying distances between the first headrest post and the second headrest post, such that when the headrest posts are inserted into the hole and slot, the attachment portion does not require additional parts to prevent substantial movement of the attachment portion in any direction parallel with the attachment portion, and the attachment portion is sufficiently thick such that, when the system is installed over the headrest posts, the system does not require additional parts to prevent substantial rotation of the attachment portion along an axis between the hole and the slot; and a utility portion, the utility portion connected to the attachment portion and having sufficient width to accommodate a tablet computer;

where the utility portion and attachment portion comprise a single piece of rigid material; and where when the system is installed over the headrest posts, the utility portion is positioned between the attachment portion and a second vehicle seat directly behind the first vehicle seat.

14. The shelf system of claim 13, where the attachment portion is thicker than the utility portion.

15. The shelf system of claim 13, where attachment portion utility portion have been joined together using a solvent to form the single piece of rigid material.

16. The shelf system of claim 13, where attachment portion and utility portion have been welded together to form the single piece of rigid material.

17. The shelf system of claim 13, where attachment portion, and utility portion have been formed from a solid piece of rigid material bent to form the angle between the attachment portion and the utility portion.

18. The shelf system of claim 13, where attachment portion and utility portion have been molded to form the single piece of rigid material.

* * * * *